Patented Feb. 19, 1946

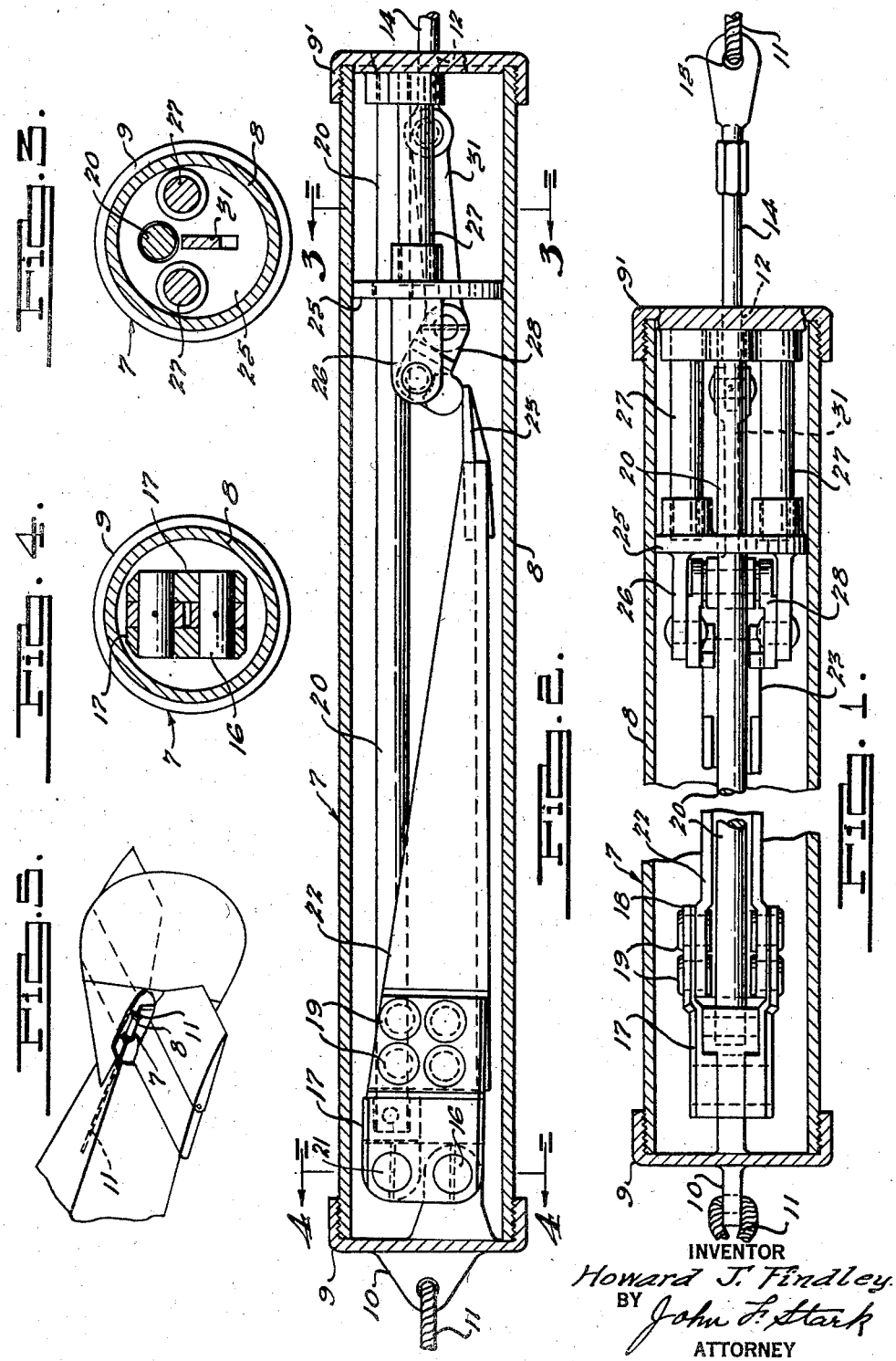

2,395,261

UNITED STATES PATENT OFFICE 2,395,261

CONSTANT TENSION DEVICE

Howard J. Findley, Shaker Heights, Ohio, assignor to Eaton Manufacturing Company, Cleveland, Ohio, a corporation of Ohio Application March 10, 1942, Serial No. 434,133

9 Claims. (Cl. 74—501)

This invention relates to constant tension devices for force transmitting cables, rods and the like, and, more particularly, concerns an automatically thermo-responsive adjustment device adapted to be associated with an aircraft control cable.

Heretofore, aircraft have not been especially difficult to handle, when properly rigged, for operation over a wide temperature range as may be encountered from sea level or below up to the service or absolute ceiling of the ship. This was true whether the aircraft was based below the equator in a tropical climate or far above the equator in the arctic regions, because the practical operating ceiling of the best planes was about 25,000–30,000 feet. With the advent of a much higher operating ceiling in so-called strato-liners and high altitude fighting ships with greatly increased super-charged power plants, the aircraft passed through an even greater range of temperature. For example, an aircraft based in a tropical climate, where the temperature in the ship on the ground may be 100°–150° F., can be flown to an altitude where the temperature may reach 67° below zero, in a very few minutes. Under such an unusual temperature range if the aircraft were rigged for the high temperature at the ground, the tension or control of the cables at the high altitudes mentioned is seriously affected, and, conversely, if the plane was rigged with a tension in the cables commensurate with temperatures to be encounted at such high altitudes, the safe or efficient maneuverability of the plane in take-offs and landing is dangerous. Such conditions as enumerated are real and potential factors to be dealt with, and the necessity for means to make such aircraft safe and efficient to maneuver has only recently arisen with the introduction of aircraft, in the race to get "on top," which actually are capable of attaining such altitudes and have encountered these conditions. This is particularly true of fighting ships which must have a high degree of accurate maneuverability at all altitudes at which they may operate; also of heavy cargo ships that may have high landing speeds and require a delicate sense of feel or maneuverability on the controls if the ship is not to be "stalled" in landing after descent from a high altitude. The necessity for such a device is likewise very important in aircraft having a so-called "automatic pilot," as distinguished from manual or pilot operated planes, which comprises a mechanical gyroscopic means for automatically keeping the plane on a given course and altitude. In planes so equipped extraneous forces such as cross-winds, updrafts, and air currents, which tend to divert the aircraft from a predetermined heading and altitude for which it was set, are resisted by compensation of the automatic pilot, and it will be apparent any change in the tension or length of the control cables will seriously affect the degree of compensation or sense of movement change from the fixed course that may be developed by the automatic mechanism.

It will be understood that the necessity for such an automatic constant tension cable control means, results from the unlike coefficients of expansion of the various metals comprising the aircraft structure and to which cables may be run for control thereof or by which the cable may be supported. A great portion of an aircraft fuselage and wing is composed of aluminum or its alloys which generally have a large coefficient of expansion with heat and contraction with cold, while a braided or stranded wire cable usually of steel has a very different and smaller coefficient of expansion. If the several cable controls on an aircraft are rigged with a given tension, generally 100–150 pounds, it will be apparent how the extensive thermal change in the atmosphere will affect the sense of touch or "feel" and degree of movement necessary to impart to the controls to produce a given result or execute a fine maneuver. At the high altitudes referred to, the cables become so slack as to require an unduly large movement to effect control movement thereby, while at a comparatively high temperature, which may exist near the ground, the cables become so taut as to place an undue strain on the controls. The reason for this in view of the foregoing explanation is that the predominantly aluminum aircraft structure including the "skin" of the ship shrinks or contacts much more rapidly under cold than the braided wire steel cables, and, consequently, the cable becomes slack or the tension reduced therein. In the opposite condition, i. e. under elevated temperatures the reverse is true, the aircraft structure expands more rapidly than the control cable and the tension in the cable increases to an amount not suitable for the pilot to strain against. For structural and physical properties of the metals, that is to say because of the weight and strength of each metal, it is necessary to use a pair of metals such as aluminum and steel although they have widely different coefficients of expansion. Accordingly, to this end the present invention proposes to incorporate automatically adjustable means in the control cable lines which will produce a substantially constant tension therein over a broad temperature range.

Among the objects of the present invention is the provision of a constant tension device in an aircraft cable which is automatically thermo-responsive over a wide temperature range; the provision of a device, as above described, to be serially joined in the cable lines and in which is included at least two metals having very unlike coefficients of expansion by means of which the differential maintained in their effective lengths provides a constant tension in the cable; the provision in a device, as above described, which is comprised in part of a metal having the greatest possible coefficient of expansion and a second metal associated therewith having a very small thermo-responsive coefficient of expansion. The provision in such a constant tension device, of an aluminum supporting structure and an Invar rod or strut associated therewith by multiple levers producing a predetermined mechanical advantage to compensate for elongation or contraction in the effective length of a control cable connected thereto.

Another object of the present invention is the provision in a thermo-responsive constant tension device for control cables of a frame or structure comprised of a metal having a relatively large differential in its effective length or dimensions by reason of its large coefficient of expansion and a second metal, associated therewith and cooperable through lever means which produces a predetermined mechanical advantage, in which the metal with a high coefficient of expansion is in most direct contact with the temperature changes thereby substantially reducing lag, behind the highly thermally affected composite structure in which it is used.

A further object of this invention is to utilize the metal having the greatest coefficient of expansion as a casing to enclose the balance of the structure thereby sealing it from dust, tampering, etc.

A still further object of this invention is to have the casing so arranged that in the event of failure or breakage in the associated linkage the casing will prevent loss of control of the plane whereby the outer structure will permit only a limited movement of the devices to which the cable is attached.

Further and other objects and advantages of this invention reside in the novel combination and arrangement of parts about to be described when taken in conjunction with the drawing, forming a part of this specification, and more particularly pointed out in the appended claims.

In the drawing like reference characters denote corresponding parts in the several views, and in which:

Fig. 1 is a sectional plan view with portions broken away through a preferred form of constant tension device forming the subject matter of this invention;

Fig. 2 is a sectional elevational view with portions broken away through the device of Fig. 1;

Figs. 3 and 4 are sectional views taken substantially on the lines 3—3 and 4—4, respectively, of Fig. 2; and Fig. 5 is a view of a fragmentary portion on an aircraft illustrating the manner in which a control cable and a constant cable tension device may be incorporated therein.

Now having reference to the drawing, and particularly Figs. 1 and 2, there is shown a constant tension device, generally designated 7, which has a housing or tubular support 8 composed of aluminum, as an example of a metal having a relatively high coefficient of expansion. At either end of the tube 8 are secured cover members or cap pieces 9 and 9', the cap piece 9 having an external attachment lug 10 for securing one end of a control cable or force transmitting member 11 thereto. The other cap piece 9' has a central aperture 12 for slidably journalling a short rod 14 therein, said rod having an eye 15 at the outer end thereof to which the other end of the control cable 11 is secured.

Within the tube 8 and pivotally anchored at 16 thereto, to a lug on the inside face of the cap piece 9, is a short pivotable lever arm 17 to which is suitably secured, as by the pin means 21 shown, one end of an Invar rod 20 extending longitudinally of the tube 8, but disposed to one side of the axis of the tube, as shown in Figs. 2 and 3. The rod 20 of Invar has a very small coefficient of thermal expansion and hence maintains a substantially uniform or constant length throughout the broad range of temperatures to which it may be subjected, while the aluminum tube has a high coefficient of expansion and tends to expand rapidly with thermal changes, yet the arrangement and association of the parts through the levers produce a mechanical advantage which maintains an effective differential in the lengths of the unlike expansivity of the tube and rod to provide a constant tension in a cable over a wide range of operating temperatures. Secured to a bifurcated or yoke-like end 18 of the lever arm 17 by the pin means 19, is a relatively deep U-shaped member 22 which surrounds or bridges the same and extends longitudinally of the axis of the tube 8 beneath the Invar rod, but which tapers off toward the free right hand end thereof so as to form a lever member. This U-shaped lever member 22 is formed of steel for its strength in transmitting the mechanical advantage afforded by its outer finger-like end 23, for a purpose to be described later.

The opposite end of the Invar rod 20 is anchored in or to the right hand cap piece 9' by any suitable fastening means being freely extended through an apertured plate 25 which is fixed in position by a pair of axially offset short Invar rods 27 extended from the opposite face of the plate 25 to the cap piece 9'. A bell-crank 28 is pivotally mounted between spaced parallel journals 26 extended normally from the plate 25 and has one arm arranged to bear against the finger-like end 23 of the steel lever 22, while the other arm of the bell-crank is pivotally pinned to the inner end of a short link 31, having an outer bifurcated end in turn secured by a clevis pin to the inner end of the slidable rod 14.

Throughout the specification and claims where the phrase "coefficient of expansion" is used it will be understood to be taken in its generic or commonly accepted sense, i. e. to mean "expansion," when subjected to increase in temperature, or "contraction" when subjected to a decrease in temperature from the normal. Likewise although the present device is concerned with a "tension" force rigged in a "cable" it will be understood the device is equally applicable to force transmitting means such as rods or other control mechanisms which are capable or useful for withstanding "compression" to forces to maintain a constant stress or length therein.

The use and mode of operation of the constant tension, thermo-responsive device is as follows: Assume the portion of the aircraft structure, shown in Fig. 5, and hence a representative cable control 11 thereof, has undergone a great temperature decrease from plus 100° F. to minus 67° F. The majority of the aluminum parts or alloys thereof comprising the aircraft structure and the mounting means for the control cable undergo a sizeable change in dimension due to their inherent high coefficients of contraction, while the control cable, usually of braided steel wire for strength, is not contracted as much thereby altering its effective dimensional length by the temperature change because of a lesser coefficient of contraction. However, since the control cable is supported or trained through various portions of the aircraft between its opposite ends, one end of which is actuated by the pilot (by actuating means not shown) and the other end acts upon an aircraft control member with a predetermined rigged tension for a given cable movement, any change in the effective length of the control cable will seriously affect the control tension for which it was rigged and movement of the controlled part in a given maneuver desired to be imparted to the aircraft. With the present constant tension device serially joined in a cable control 11, as illustrated in Fig. 5, the cable is shortened automatically to maintain the initial tension for which it was rigged, before the assumed temperature decrease. This is accomplished by the highly longitudinally contractible tube 8 and associated parts therein which tend to shorten cable 11 through the slidable rod 14 connected thereto which extends into the tube body. The aluminum tube is thus exposed to the most direct contact with the temperature variations thereby reducing lag in the response of the device coincident with other temperature changes induced in the aircraft. It will now be apparent the relatively small coefficient of expansion of the Invar rods 20 and 27 will be negligibly affected by the temperature change and hence maintain substantially constant lengths thereunder. Accordingly, through the arrangement of the U-shaped member 22 with its finger-like lever 23, and the bell-crank 28 in contact therewith, a lever arm of predetermined movement is produced which changes the effective lengths of the cable to compensate for contraction induced in the contractible parts by the assumed temperature change and thereby maintains a substantially constant tension in the cable. Under the reverse set of temperature conditions, upon return to an elevated temperature of 70°–120° F. above zero near the ground, expansion of the aircraft structure requires lengthening the cables supported thereby. The aluminum tube 8 exerts a reverse effect on the Invar rods 20 and 27 which is transmitted through the U-shaped lever 22 and bell-crank 28 to the associated rod 14 thereby lengthening the control cable 11 attached thereto.

By reason of mechanical limitations imposed by the structure in which it is used the tube is formed of aluminum for lightness and its associated high coefficient of expansion, while the Invar metal is employed for its low coefficient of expansion. Furthermore in view of the construction of the present device a very desirable safety factor is involved in its use on aircraft by reason of the aluminum tube having one end of the control cable connected thereto and the other end of the cable connected to the short rod 14, which has an eye on the inside face of the cap piece 9' that cannot pass therethrough, and if the thermo-responsive elements within the tube should become inoperative or fail the compensated end of the cable would be drawn up against the cap piece 9' with some loss of the tension rigged therein but still useful in an operative condition. Such a constant tension device may be used upon the several flight control cables of the aircraft, stabilizers, etc., although it is obviously not confined to aircraft structures and may be used equally well on all mechanisms having parts subject to broad temperature changes and composed of metals of widely unlike coefficients of expansion.

From the foregoing, it will be apparent there has been disclosed a constant tension device for a control cable embodying, among other things the objects and advantages of the invention first enumerated, although it is not intended to be limited to the specific example shown, which is merely by way of illustration and will be subject to many variations in actual practice by those skilled in the art to which it is related, and the spirit and substance of the broad invention is covered by the scope of the following claims.

What I claim is:

1. An automatic thermally responsive device adapted to be connected in series with a pre-rigged force transmitting control cable to maintain a given stress in said control cable by compensating for thermal expansion and contraction of said control cable, comprising: a pair of substantially parallel elements having different coefficients of expansion; means connecting said elements together at one end thereof, the other end of one of said elements being connectable with a portion of said control cable; movable means connectable with another portion of said control cable; and means including a movement multiplying lever system operable in response to the differential expansion of said pair of elements for actuating said movable means to effect longitudinal movement thereof in accordance with said differential expansion to vary the effective length of said control cable and thereby maintain a substantially constant stress in said control cable throughout the range of temperature change to which said control cable is subjected.

2. An automatic thermally responsive device adapted to be connected in series with a pre-rigged force transmitting member to maintain a given stress in said force transmitting member and to compensate for thermal expansion and contraction of said force transmitting member, comprising: a pair of substantially parallel elements having different coefficients of expansion; means connecting said elements together at one end thereof, the other end of one of said elements being connectable with a portion of said force transmitting member; movable means connectable with another portion of said force transmitting member; and means including a pair of cooperating bell crank levers operable in response to the differential expansion of said pair of elements for actuating said movable means to effect longitudinal movement thereof in accordance with said differential expansion to vary the effective length of said force transmitting member and thereby maintain a substantially constant stress in said force transmitting member throughout the range of temperature change to which said force transmitting member is subjected.

3. An automatic device adapted to be connected in series with and as a part of a force transmitting member and to maintaining a stress initially set up in said force transmitting member during the pre-rigging thereof relative to a structure having a coefficient of expansion different from that of the effective coefficient of expansion of said force transmitting member, comprising; a main metal body having a coefficient of expansion such that the linear dimension thereof is substantially changed by temperature variations, said main metal body being connectable with a portion of said force transmitting member; a second metal body fixedly secured to said main metal body, said second metal body having a coefficient of expansion such that the linear dimension thereof is substantially unchanged by said temperature variations; a mechanical linkage operatively interconnecting said metal bodies arranged to be actuated thereby in accordance with the differential expansion of said metal bodies; and means connectable with another portion of said force transmitting member and operable upon actuation of said mechanical linkage to vary the effective length of said force transmitting member in accordance with said temperature variations, whereby to maintain the stress initially rigged in said force transmitting member substantially constant.

4. An automatic thermally responsive device as defined in claim 3, in which means is associated with said means which is connectable with said other portion of said force transmitting member to prevent complete loss of said stress in event of failure of said metal second body.

5. A thermally responsive device adapted to be connected in series with a pre-rigged force transmitting means to maintain a substantially constant stress in said force transmitting means, comprising: an elongated member connectable with one portion of said force transmitting means; a second elongated member having a coefficient of expansion different from that of said first-mentioned member; means fixedly securing said members together at one end thereof with said members arranged substantially parallel; a first lever pivotally supported relative to said first-mentioned member; means pivotally interconnecting one arm of said first lever and the free end of said second member; and a second lever pivotally supported relative to said first-mentioned member, one end of said second lever being actuable by the other arm of said first lever and the other arm of said second lever being connectable with another portion of said force transmitting means.

6. A thermally responsive device adapted to be connected in series with a pre-rigged force transmitting means to maintain a substantially constant stress in said force transmitting means, comprising: an elongated tubular housing connectable with a portion of said force transmitting means; an elongated rod in said housing having a coefficient of expansion different from that of said housing; means fixedly securing one end of said rod to said housing; a first bell crank lever in said housing pivotally mounted relative to said housing; means pivotally interconnecting one arm of said first bell crank lever and the other end of said rod; and a second bell crank lever in said housing pivotally mounted relative to said housing, one end of said second bell crank lever being actuable by the other arm of said first bell crank lever and the other arm of said second bell crank lever being connectable with another portion of said force transmitting means.

7. A thermally responsive device adapted to be connected in series with a pre-rigged force transmitting means to maintain a substantially constant stress in said force transmitting means, comprising: a tubular housing; a first cap member fixed to one end of said housing; a second cap member fixed to the opposite end of said housing; a rod having a coefficient of expansion different from that of said housing mounted upon the inner face of said first cap member and extending longitudinally within said housing to a point adjacent said second cap member; said second cap member being exteriorly connectable with a portion of said force transmitting means and having a lug on the inner face thereof; a first bell crank lever pivotally mounted upon said lug; means pivotally interconnecting one arm of said first bell crank lever and the adjacent end of said rod; a support within said housing; means maintaining said support spaced a fixed distance from said first cap member; and a second bell crank lever pivotally mounted upon said support, one arm of said second bell crank lever being engageable with the other arm of said first bell crank lever and the other arm of said second bell crank lever being connectable with another portion of said force transmitting means.

8. A thermally responsive device adapted to be connected in series with a pre-rigged force transmitting means to maintain a substantially constant stress in said force transmitting means, comprising: a cylindrical housing made of aluminum; a first cap member fixed to one end of said housing; a second cap member fixed to the opposite end of said housing; an Invar rod mounted upon the inner face of said first cap member and extending longitudinally within said aluminum housing to a point adjacent said second cap member, said second cap member being exteriorly connectable with a portion of said force transmitting means and having a lug on the inner face thereof; a first bell crank lever pivotally mounted upon said lug; means pivotally interconnecting one arm of said first bell crank lever and the adjacent end of said Invar rod; a support within said aluminum housing; a pair of Invar rods mounted upon the inner face of said first cap member and connected with said support to maintain said support spaced a fixed distance from said first cap member, said support having an opening through which said Invar rod extends; a second bell crank lever pivotally mounted upon said support, one arm of said second bell crank lever being engageable with the other arm of said first bell crank lever; a link having one end thereof connected with the opposite arm of said second bell crank lever; and a rod extending through an opening in said first cap member having one end thereof connected with the opposite end of said link, the other end of said rod being connectable with another portion of said force transmitting means.

9. A thermally responsive device adapted to be connected in series with a pre-rigged force transmitting means to maintain a substantially constant stress in said force transmitting means, comprising: a cylindrical housing made of aluminum; a first cap member fixed to one end of said housing; a second cap member fixed to the opposite end of said housing; an Invar rod mounted upon the inner face of said first cap member and extending longitudinally within said aluminum housing to a point adjacent said second cap member, said second cap member being exteriorly connectable with a portion of said force transmitting means and having a lug on the inner face thereof; a first bell crank lever pivotally mounted upon said lug; means pivotally interconnecting one arm of said first bell crank lever and the adjacent end of said Invar rod; a support within said aluminum housing; a pair of Invar rods mounted upon the inner face of said first cap member and connected with said support to maintain said support spaced a fixed distance from said first cap member, said support having an opening through which said Invar rod extends; a second bell crank lever pivotally mounted upon said support, one arm of said second bell crank lever being engageable with the other arm of said first bell crank lever; a link having one end thereof connected with the opposite arm of said second bell crank lever; and a rod extending through an opening in said first cap member having one end thereof connected with the opposite end of said link, the other end of said rod being connectable with another portion of said force transmitting means, said last-mentioned rod having an abutment within said housing too large to pass outwardly through said opening in said first cap member, whereby only partial loss of the pre-rigged stress will result in event of failure of said Invar rod.

HOWARD J. FINDLEY.